(12) United States Patent
Peng

(10) Patent No.: US 8,755,650 B2
(45) Date of Patent: Jun. 17, 2014

(54) GRADIENT INDEX OPTICAL WAVEGUIDE COUPLER

(75) Inventor: Chubing Peng, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 39 days.

(21) Appl. No.: 13/228,118

(22) Filed: Sep. 8, 2011

(65) Prior Publication Data
US 2013/0064514 A1 Mar. 14, 2013

(51) Int. Cl.
G02B 6/26 (2006.01)
G02B 6/28 (2006.01)
G02B 6/42 (2006.01)

(52) U.S. Cl.
USPC .......................................... 385/31; 385/124

(58) Field of Classification Search
USPC .................................... 385/31, 124
See application file for complete search history.

(56) References Cited

U.S. PATENT DOCUMENTS

| | | | |
|---|---|---|---|
| 4,731,670 A * | 3/1988 | Allen et al. | 347/240 |
| 6,888,984 B2 | 5/2005 | Abeles et al. | |
| 7,027,700 B2 | 4/2006 | Challener | |
| 7,336,988 B2 | 2/2008 | Schnitzer | |
| 7,652,954 B2 | 1/2010 | Fontana et al. | |
| 7,880,996 B2 | 2/2011 | Stipe | |
| 8,169,881 B2 | 5/2012 | Balamane et al. | |
| 8,264,918 B2 | 9/2012 | Hashimoto et al. | |
| 8,351,151 B2 | 1/2013 | Katine et al. | |
| 8,369,192 B1 | 2/2013 | Komura et al. | |
| 2003/0031410 A1* | 2/2003 | Schnitzer | 385/34 |
| 2003/0165293 A1* | 9/2003 | Abeles et al. | 385/33 |
| 2004/0062503 A1 | 4/2004 | Challener | |
| 2008/0049563 A1* | 2/2008 | Konno et al. | 369/13.24 |
| 2008/0149809 A1 | 6/2008 | Hamann et al. | |
| 2008/0151360 A1 | 6/2008 | Stipe | |
| 2010/0163521 A1 | 7/2010 | Balamane et al. | |
| 2010/0165499 A1 | 7/2010 | Stipe | |
| 2010/0165802 A1 | 7/2010 | Stipe | |
| 2010/0165822 A1 | 7/2010 | Balamane et al. | |

OTHER PUBLICATIONS

Shyroki et al., "Dielectric Multilayer Waveguides for TE and TM Mode Matching", J. Opt. A: Pure Appl. Opt. 5, 2003, pp. 192-198.
Jun. 11, 2013, File History for U.S. Appl. No. 13/550,280.

* cited by examiner

*Primary Examiner* — Jerry Blevins
(74) *Attorney, Agent, or Firm* — Hollingsworth Davis, LLC

(57) ABSTRACT

A light source is coupled to an input facet that directs light from the light source to a core layer of a waveguide and a gradient index material layer disposed beside the core layer along a portion of a propagation length of the waveguide. Light is launched from the light source into the input facet. In response, the gradient index material layer directs light to the core layer at least along the portion of the propagation length.

20 Claims, 7 Drawing Sheets

GRADIENT INDEX OPTICAL WAVEGUIDE COUPLER

BACKGROUND

The present disclosure relates to optical components used in applications such as heat assisted magnetic recording (HAMR). A HAMR device utilizes a magnetic recording media (e.g., hard drive disk) that is able to overcome superparamagnetic effects that might otherwise limit the areal data density of typical magnetic media. In order to record on this media, a small portion of the media must be locally heated while being written to by a magnetic write head. A coherent light source such as a laser may provide the energy to create these hot spots, and optical components, e.g., built in to a slider that houses the write head, are configured direct this energy onto the media.

SUMMARY

Various embodiments described herein are generally directed to methods, systems, and apparatuses that facilitate providing light in a selected waveguide mode for a near field transducer of a heat assisted magnetic recording head. In one embodiment, a waveguide of an apparatus includes a core layer extending along a propagation length of the waveguide. A cladding layer surrounds at least part of the core layer along the propagation length. A gradient index material layer is disposed beside the core layer along a portion of the propagation length where light is launched into the waveguide via an input facet. The gradient index material layer is configured to direct light from the input facet to the core layer at least along the portion of the propagation length.

In another embodiment, a method involves coupling a light source to an input facet that directs light from the light source to a) a core layer of a waveguide, and b) a gradient index material layer disposed beside the core layer along a portion of a propagation length of the waveguide. The light is launched from the light source into the input facet so that the gradient index material layer directs the light to the core layer at least along the portion of the propagation length.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
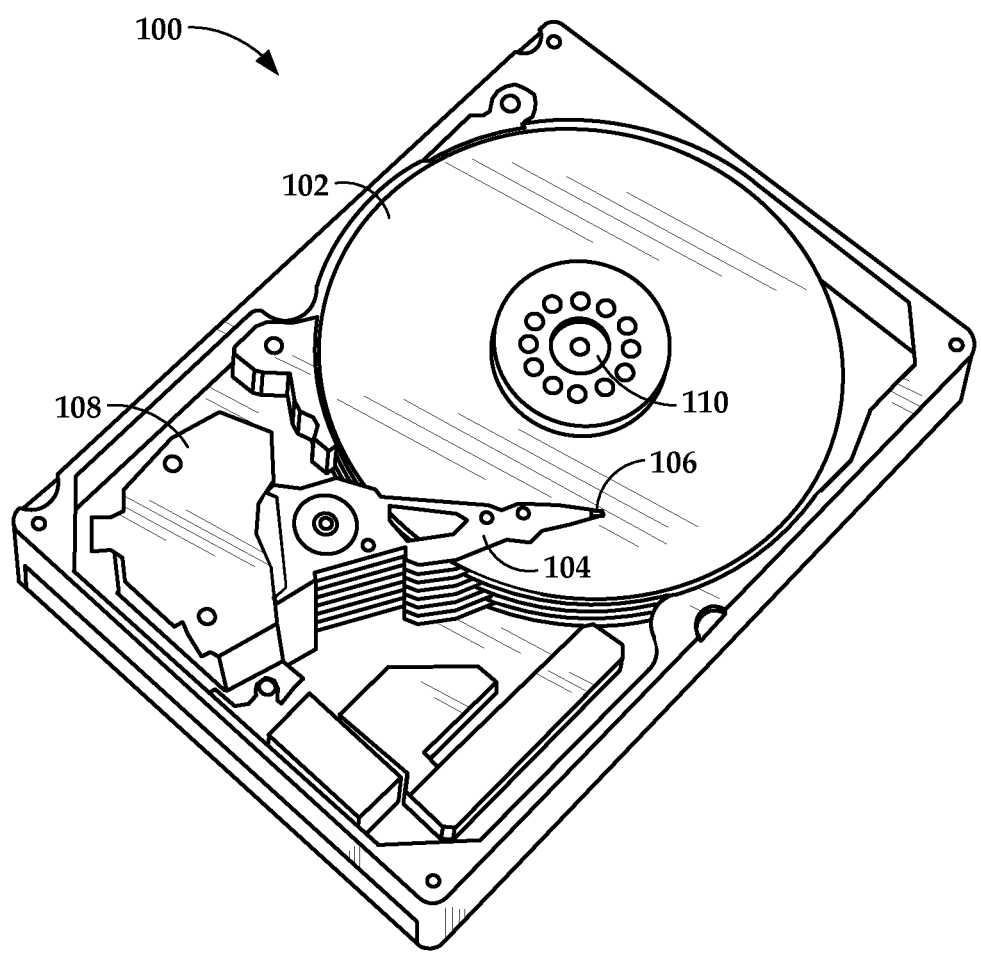
FIG. 1 is a perspective view of a hard drive apparatus according to an example embodiment.

In heat assisted magnetic recording (HAMR), information bits are recorded in a storage layer at elevated temperatures. The heated area in the storage layer determines the recording density in some configurations. For example, the size of the heated area may be inversely related to the potential data storage density of the device, e.g., the smaller the heated area, the greater the potential data storage density. Therefore such devices may include features for delivering electromagnetic energy to heat a small media area, and strive to do so with as little loss of energy as possible.

One way to achieve a tiny confined hot spot is to use an optical near-field transducer (NFT), such as a plasmonic optical antenna or an aperture, located near an air bearing surface of a hard drive slider. Light is launched from a light source (e.g., a laser diode) into an optical waveguide built into a slider from a core and cladding with different indices of refraction. The waveguide may include a high contrast between respective refractive indices of the core and cladding. Light propagating in the waveguide may be directed to an optical focusing element, such as a planar solid immersion mirror (PSIM), which may concentrate the energy into the optical NFT. In other approaches, the waveguide may be directly coupled to the optical NFT. One of the challenges encountered in these variations is how to launch light into the slider-integrated waveguide with low cost, good alignment tolerance, and high light delivery efficiency.

The NFT and PSIM may be integrated optics devices that are formed integrally with the slider. The field of integrated optics relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle layer having a refractive index $n_1$ as a core, and top/bottom layers of refractive indices $n_2$ and $n_3$ performing as cladding. In configurations such as where $n_2 = n_3$, $n_1 > n_2$, and $n_1 > n_3$, light may propagate through the waveguide similarly to an optic fiber. Other optical components may be formed in similar fashion, including the NFT and PSIM discussed above.

In a HAMR slider, light is launched into these integrated optics components for purposes of delivering optical energy to heat the media during the recording process. One way to launch light into a slider is from free space by a grating coupler fabricated in a slider, called free space light delivery. Another way is to place a laser light source, such as a laser diode, into the slider, called laser-in-slider light delivery. Free space light delivery assembly may be expensive to mass-produce. In contrast, laser-in-slider light delivery can be integrated at a wafer level and is generally considered more suitable for mass production.

The present disclosure is directed to devices and techniques to effectively achieve laser-in-slider light delivery to integrated optics. In such devices, the light usually originates from a light source such as a laser diode. The light source may be an electro-optical device fabricated separately from the slider. The device may be coupled to the slider during production using a bonding operation that creates electrical connections that power the laser, as well as optically coupling the laser to the optical components of the slider.

One challenge in such assemblies is efficiently coupling the output of the light sources with integrated optics component. For example, a commercially available light source such as a laser diode may have a beam profile that is not ideally suited to waveguides needed to carry light through the slider for delivery to the media. As will be described in greater detail below, such a recording device may use a slider-integrated coupler that helps concentrate light into a profile suitable for a channel or planar waveguide that is used to deliver light through the slider for heating a recording media.

The techniques described herein may be used, for example, in read/write heads of a magnetic data storage device such as hard drive apparatus 100 shown in FIG. 1. The apparatus 100 generally includes at least one magnetic disk 102 that rotates around a spindle axis 110. The apparatus 100 further includes an arm 104 with an end-mounted a transducer head 106 that is positioned over a surface of the disk while reading from or writing to the disk 102. The arm 104 is driven by an actuator 108 to move radially across the disk 102. This movement of the arm 104 positions the transducer head 106 over on the disk 102 to read from or write to tracks on the disk 102. A hard drive of this type may include multiple arms 104 and disks 106 arranged in a stack formation, and may include read/write heads that read/write from/to both surfaces of the disks 102.

The transducer head 106 (also referred to as a "slider") may include both magnetic read and write heads. A read head generally operates by detecting a changing magnetic field, e.g., changes in direction of magnetic flux caused by relative motion between an encoded magnetic media and the read head. The read head converts the flux reversals into an electrical analog signal that represents data stored on the media. The write head operates in response to a current sent through a conductor surrounding a write pole, which generates a magnetic field at a tip of the write pole. This magnetic field in turns changes the orientation of a local magnetic field local at the surface of the disk 102, causing data to be persistently stored on the disk 102.

Figure 2A:
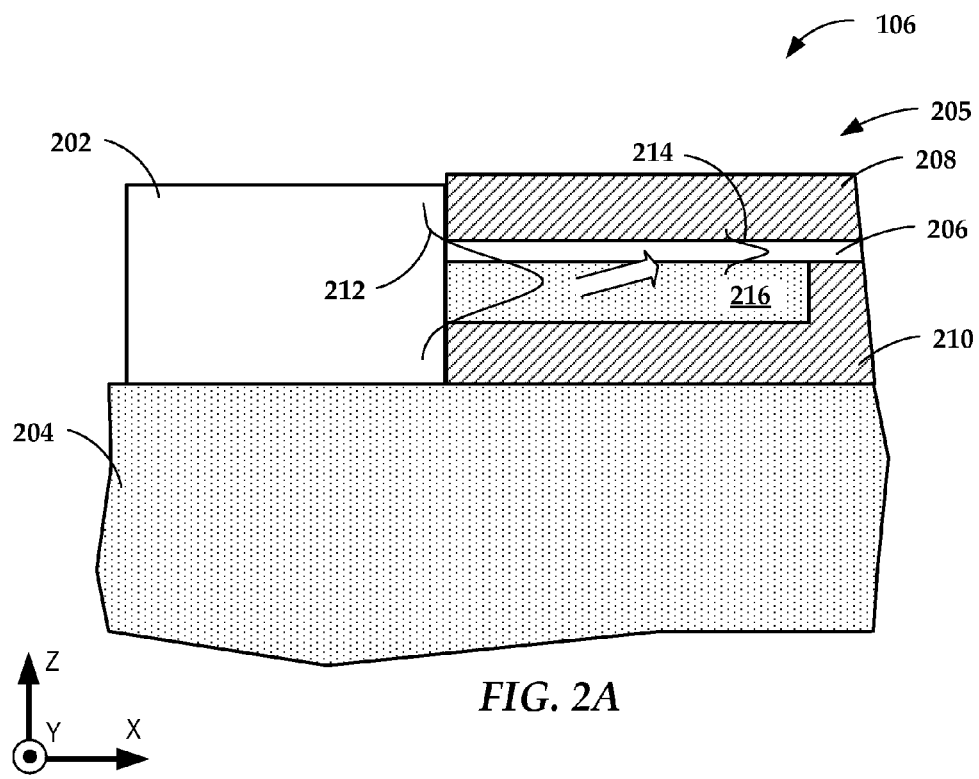
FIG. 2A is a cross-sectional view of a light source, waveguide, and coupling layer of a disk drive slider according to an example embodiment.

As described above, a HAMR recording device focuses electromagnetic energy on the disk 102 during the write process. The slider 106 may have an improved laser-in-slider light delivery as shown in the diagram of FIG. 2A. A laser 202 is mounted on a substrate 204 of slider 106. The laser 202 end-fires light into a planar waveguide 205 which includes at least a core 206 and cladding layers 208, 210. As indicated by the axis, light propagates in the x-direction, and the waveguide plane is parallel to the x-y plane.

To achieve tightly confined mode for heat-assisted magnetic recording, core layer 206 uses a dielectric material of high index of refraction, for instance, $Ta_2O_5$, $TiO_x$, $SiN_x$, SiC, and/or ZnS. The cladding layers 208, 210 are also dielectric but are of low index of refraction, such as $Al_2O_3$, $SiO_2$, and/or $MgF_2$. The waveguide 205 may be used to deliver light from the laser 202 to an NFT and/or other optical components for purposes of heating a recording medium.

A waveguide such as 205 with high contrast in index refractions of core 206 and cladding layers 208, 210 may not necessarily match the beam profile of the light exiting from a laser diode 202, as represented by respective profiles 212, 214 of the laser 202 and waveguides 205. To efficiently couple the light, an additional core layer 216 of low index of refraction may be used, such as TiSiO, SiON, and/or $ZnS$—$SiO_2$. As shown here, the layer 216 may only extend partially along the propagation length of the core layer 206 (the x-direction). It is possible that the layer 216 could extend along the full propagation length of the core layer 206, e.g., where a focal length of the layer 216 at or near to the end-to-end length of the waveguide 205.

For waveguides currently used in HAMR applications, $Al_2O_3$ is often desirable for use as cladding layers 208, 210, and to use $Ta_2O_5$ for the core layer 206. The index of refraction of the $Al_2O_3$ is n=1.64 and that of $Ta_2O_5$ is n=2.10. It may be desirable in such a case that additional core layer 216 have n=1.70. However, a dielectric material with n=1.70 is not commonly found. As a result, one aspect of this disclosure relates to forming the core layer 216 as a multilayer that can substitute for a material with a desired effective index of refraction.

Figure 2B:
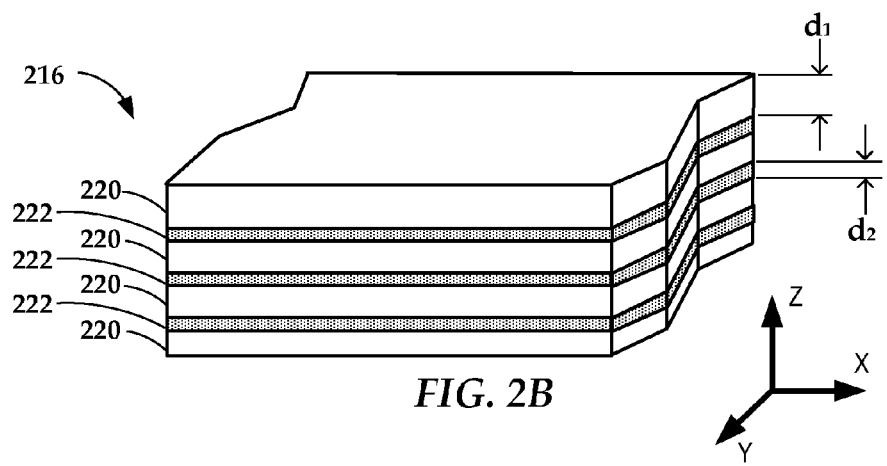
FIG. 2B is a perspective view of a layered coupling layer configuration according to example embodiments.

In one embodiment, core layer 216 can be formed by a multilayer structure, as shown in FIG. 2B. This portion of the core layer 216 is formed from a periodic layered slab of two or more materials, 220 and 222. The unit cell of this periodic structure is formed by thin slices with thickness $d_1$ and $d_2$, made of materials with differing relative permittivities $\in_1$ and $\in_2$. If the thickness of each layer is much less than the wavelength of light, the slab can be considered as an effective anisotropy metamaterial with a permittivity tensor $\in$ given by Equation [1] below, where $\in_x=\in_y=(c_1\in_1+c_2\in_2)$ and $\in_z=\in_1\in_2/(c_2\in_1+c_1\in_2)$, where coefficients $c_1=d_1/(d_1+d_2)$ and $c_2=d_2/(d_1+d_2)$.

$$\overline{\varepsilon} = \begin{pmatrix} \varepsilon_x & 0 & 0 \\ 0 & \varepsilon_y & 0 \\ 0 & 0 & \varepsilon_z \end{pmatrix} \quad [1]$$

If one of the materials of layers 220, 222 has an index of refraction greater than n=1.70 and the other one lower than n=1.70, then an effective index n=1.70 can be obtained by choosing $d_1$ and $d_2$. In one example, Yttrium oxide, $Y_2O_3$, may be chosen as the layer of high index, $n_1$=1.78, and alumina, $Al_2O_3$, chosen as the layer of low index, $n_2$=1.64. For transverse electric field waveguide modes (which is the mode light is often provided from edge emitting laser light sources), the field is parallel to the waveguide plane. In such a case, the effective index of refraction of the multilayer $n_{eff}$ is given in by Equation [2] below.

$$n_{eff} = \sqrt{\varepsilon_x} = \sqrt{\varepsilon_y} = \sqrt{\frac{d_1 n_1^2 + d_2 n_2^2}{d_1 + d_2}} \quad [2]$$

Using layers of $Y_2O_3$ and $Al_2O_3$ as in the above example, if $d_1$=40 nm and $d_2$=60 nm, $n_{eff}$=1.697. Numerical modeling shows that using this stacked grid of materials as a replacement for a homogenous layer of material in layer 216 does not degrade the coupling efficiency or the tolerance in placing a laser diode 202. Thus, layer 216 can be made with a wide range of effective refraction indices by varying these dimensions $d_1$ and $d_2$, and/or selecting materials for layers 220, 222 having respective indices of refraction that are higher and lower than the target, effective index of refraction.

Figure 3A:
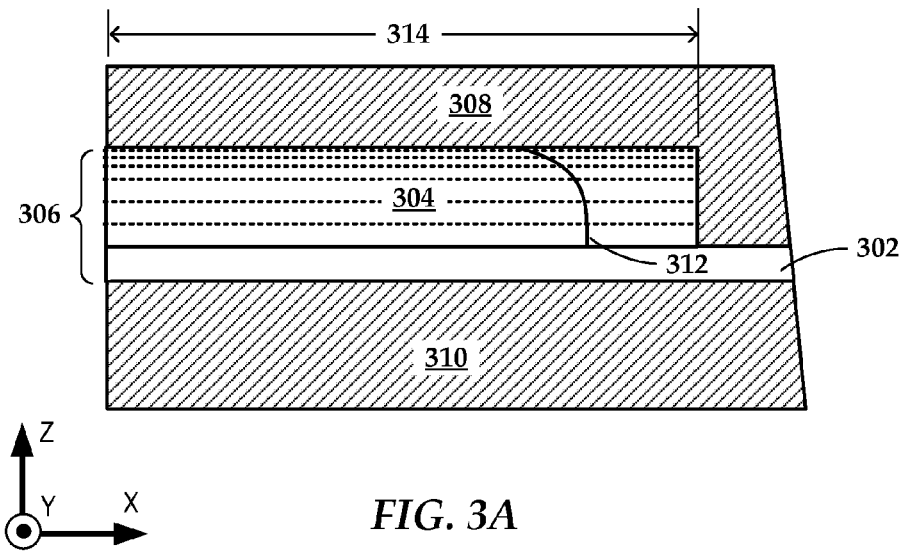
FIGS. 3A-3B are cross sectional views of GRIN coupling layer and waveguides according to example embodiments.

In another embodiment of the invention, the effective index of refraction of the layer 216 may be made variable along one or more directions of the waveguide 205. In one example, a coupling layer may be made from a gradient index (GRIN) material, an example of which is shown in FIG. 3A. A light source (not shown) launches light into a waveguide core 302 and GRIN coupling layer 304 via a facet 306. The waveguide core 302 has a high contrast of index of refraction relative to surrounding cladding layers 308, 310.

The input light, which has a broad intensity profile, is efficiently coupled into the waveguide 302 through GRIN material of coupling layer 304. The refractive index of a GRIN material varies gradually. This variance is illustrated by index profile curve 312. In this configuration, cross sections of the GRIN layer 304 parallel to the x-y plane may exhibit substantially homogeneous index of refraction. In such a case, however, the indices of the cross sections may differ from one another depending on which z-location the cross section is located.

In this example, the refractive index of the GRIN layer 304 has the highest magnitude near the waveguide core 302 and the lowest magnitude near the cladding layer 308. In one embodiment, the GRIN material of layer 304 has the same index of refraction as the core layer 302 at the GRIN/core interface and as the cladding layer 308 at the GRIN/cladding interface. The GRIN material may have an index profile 312 of any shape, including hyperbolic, parabolic, logarithmic, exponential, linear, etc. The GRIN layer may be also truncated at a particular length 314 from the input facet 306. This length 314 corresponds to the focal length of the layer 304.

The GRIN layer 304 can be fabricated by co-deposition and/or zone sputtering of two dielectric materials of high index and low index. The GRIN layer 304 can also be fabricated by alternative layer-by-layer deposition of two dielectric materials of high index and low index. This is similar to the layer 216 shown in FIG. 2B, except with varying layer dimensions $d_1$ and/or $d_2$ along the z-direction. The thickness of each layer is chosen such that the stack approximately follows a desired index profile (e.g., hyperbolic, parabolic).

Figure 3B:
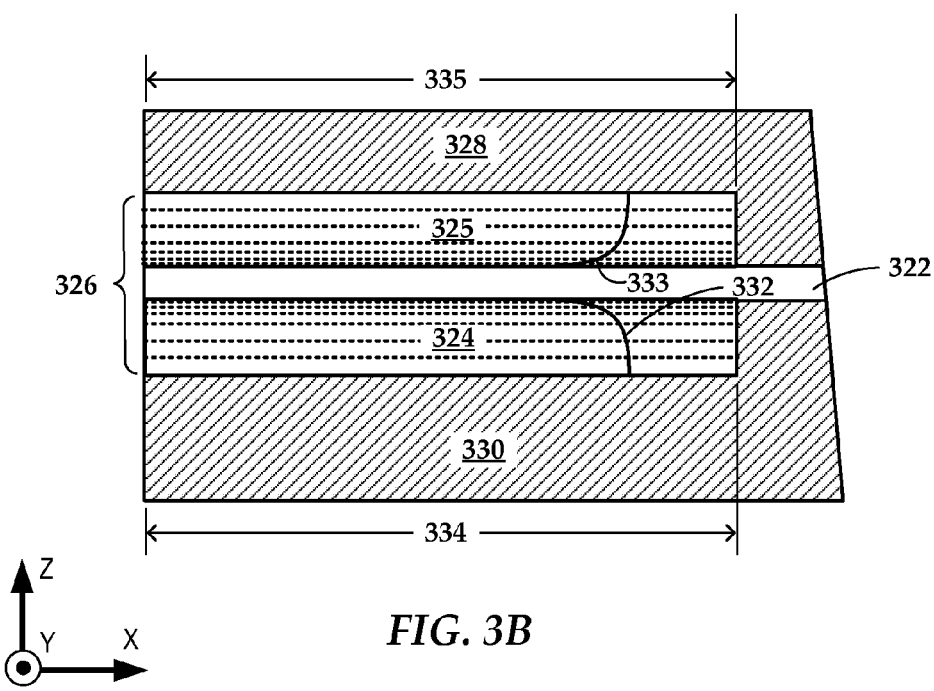

While the coupling portion of FIG. 3A includes one GRIN layer portion 304, it is possible to achieve a similar effect by using more than one GRIN layer, such as is shown in FIG. 3B. Generally, light is launched via a facet 326 that may encompass two GRIN layers, 324, 325 and a core layer 322. The illustrated GRIN layers 324, 324 are shown as substantially symmetric, e.g., same thickness and lengths 334, 335, and mirror image profiles 332, 333. However, there may be advantages in some cases in varying these or other parameters so that the layers 324, 324 are asymmetric. It should be noted that the GRIN profiles 332, 333 are different from the profile 312 in FIG. 3A. In FIG. 3A, the greatest rate of change of refractive index occurs near the GRIN/cladding interface, while in FIG. 3B the greatest rate of change of refractive index occurs near the GRIN/core interface.

Figure 4:
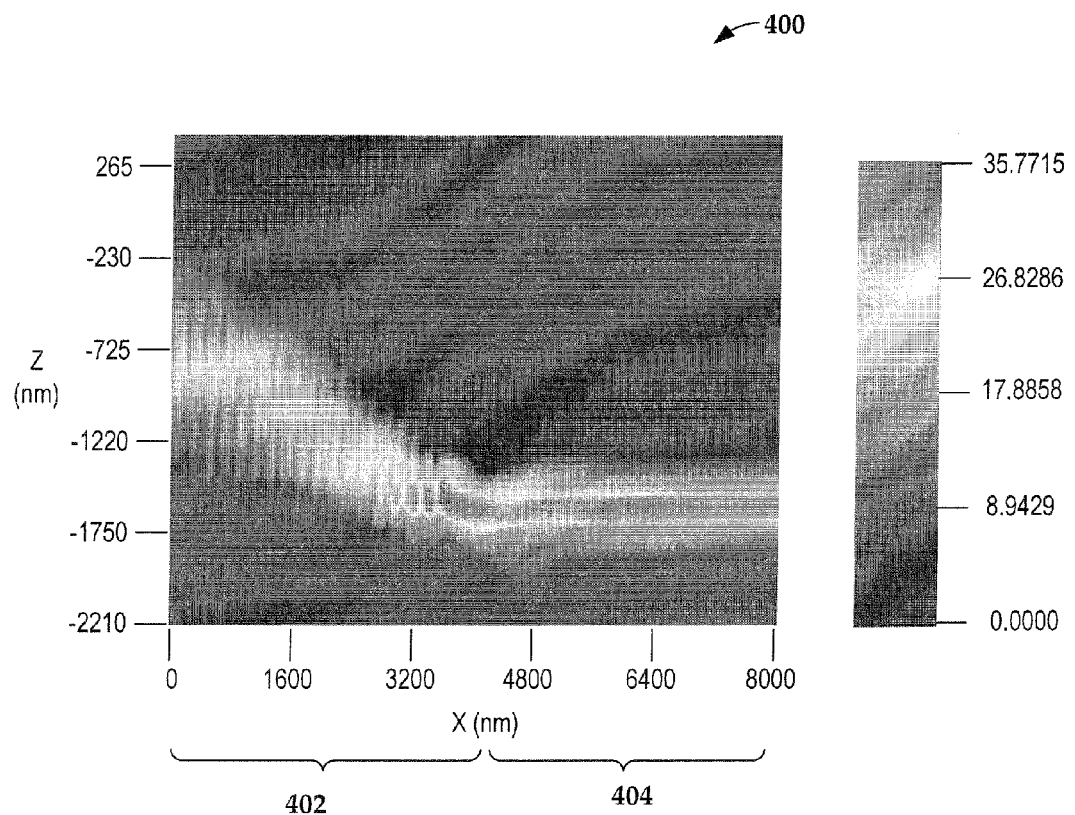
FIG. 4 is a computed amplitude profile of electrical field associated with a GRIN coupling layer such as shown in FIG. 3A of the cross sectional shape of FIG. 3B.

In reference now to FIG. 4, an amplitude profile 400 illustrates results of numerical modeling of a GRIN coupler according to an example embodiment. In this model, $Al_2O_3$ is used as the cladding layers and $Ta_2O_5$ as a 120-nm thick core layer, the core generally corresponding to region 404 in FIG. 4. The index of refraction (n) was modeled as n=1.63 for $Al_2O_3$, and n=2.09 for $Ta_2O_5$. It is assumed that the incident beam has a Gaussian profile, the beam diameter is 1.387 µm, and a light wavelength λ=830 nm. These characteristics simulate the output from a known edge-emitting diode laser.

The GRIN material was simulated as a stack of 10-layers, each layer being 150-nm thick. The index of refraction n(z) for each layer is uniform and determined by $n(z)=n_0 \text{sech}(\alpha z)$. Here $n_0$ is chosen to be the same as the index of refraction of the $Ta_2O_5$ core layer ($n_0=2.09$) and $\alpha=0.4897$ µm$^{-1}$. The variable z is the distance from the interface at the GRIN/core layer into the GRIN layer. The GRIN coupling segment (generally corresponding to region 402 in FIG. 4) is 3.6 µm long along the x-direction and 1.5 µm thick along the z-direction. The profile 400 shows the computational prediction of light propagating through the GRIN layer and being coupled into the Ta205 waveguide at portion 404. The coupling efficiency in this example is 82%.

Figure 5A:
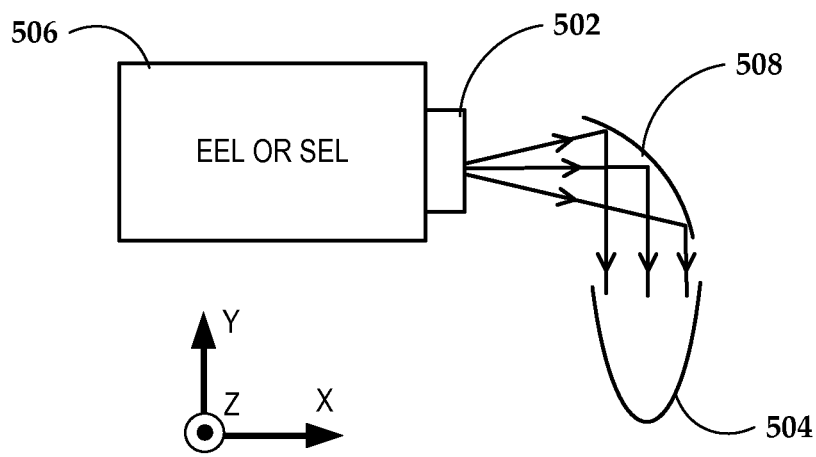
FIGS. 5A-5B are simplified view of additional slider-integrated optical components according to example embodiments.

The light source, coupler, and waveguide are only one portion of an optical system that delivers electromagnetic energy to a recording medium. In FIG. 5A, a diagram shows a simplified layout for laser-in-slider light delivery system according to an example embodiment. This embodiment uses a planar GRIN lens 502 for coupling light and a parabolic solid immersion mirror (PSIM) 504 for condensing light. Light exiting from an edge-emitting diode laser (EEL) or a surface-emitting laser (SEL) 506 is diverging. Light in the x-z plane is coupled into a planar waveguide by a planar GRIN coupler and confined in the waveguide afterward, e.g., as shown in FIG. 3A. Light propagating in the x-y plane is collimated by an off-axis parabolic mirror 508 and then focused by the PSIM 504 (e.g., onto a NFT) to create a diffraction-limited optical spot.

In some configurations, the size of the light source 506 may be large in comparison to a slider in which it is mounted. This may necessitate routing the light through a more circuitous path to deliver the optical energy to the desired location, e.g., proximate to a write transducer of the slider. This may involve utilizing additional mirrors between the light source and PSIM/NFT. An example embodiment of such a layout is shown in FIG. 5B.

Figure 5B:
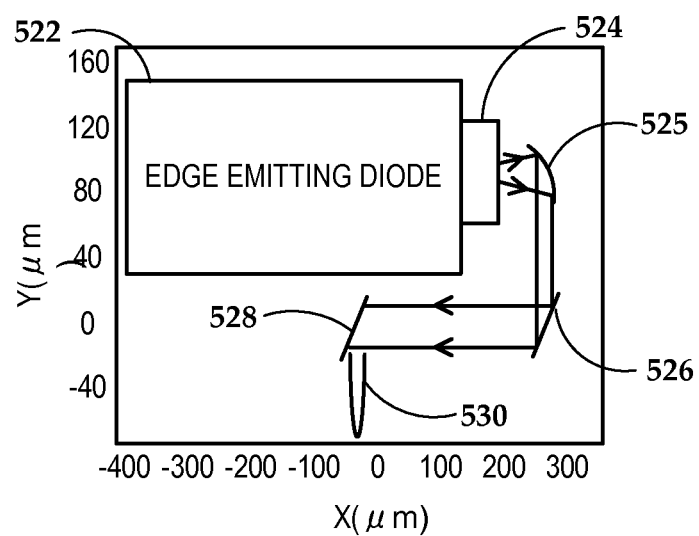

In FIG. 5B, a laser-in-slider light delivery system is illustrated in a grid that generally indicates component dimensions in the x-y plane. A light source 522 (e.g., EEL) launches light into a GRIN lens 524, which is collimated by a parabolic collimator 525. The EEL 522 is 500 µm long and the magnetic slider is 770 µm by 230 µm. The light is intended to be routed to PSIM 530, which is located approximately 400 µm from the edge of the slider in the negative x-direction. Because the x-location of the PSIM 530 is less than the combined length of the EEL 522, GRIN lens 524, and collimator 525, extra mirrors 526 and 528 are used to route the light beam to the PSIM 530. The mirrors 526, 528 may be straight and/or curved.

Figure 6A:
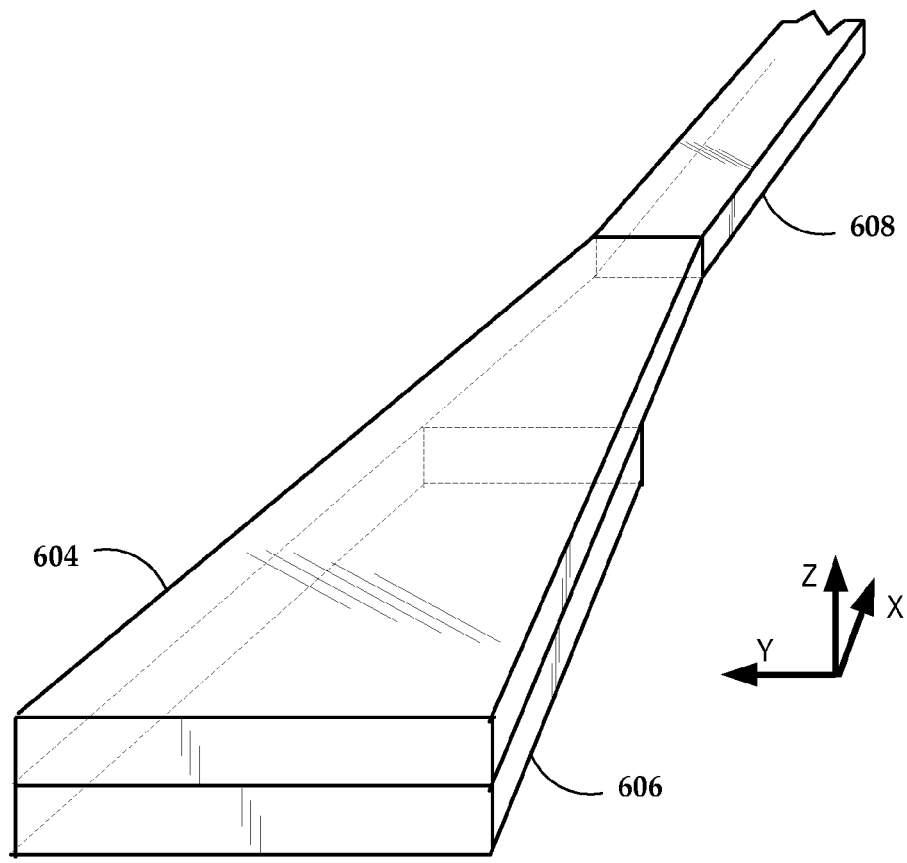
FIGS. 6A-6B are perspective and top views that show a layout for laser-in-slider light delivery system according to another example embodiment.
Figure 6B:
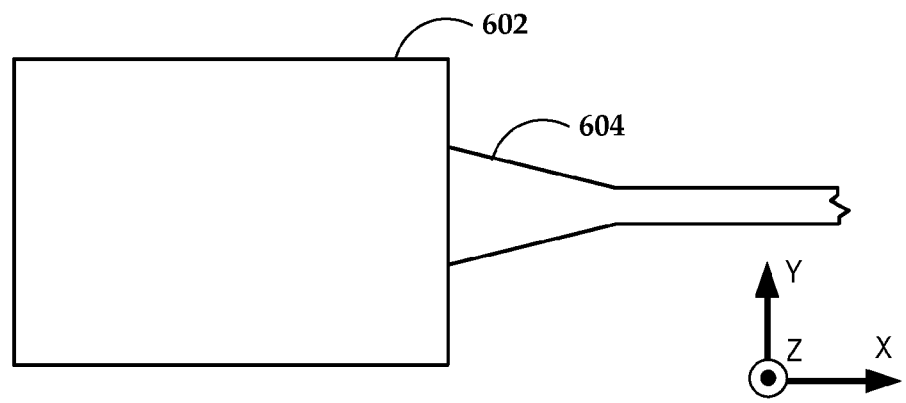

In reference now to FIGS. 6A and 6B, perspective and top views show another layout for laser-in-slider light delivery system according to an example embodiment. A light source 602 may include an EEL or SEL device. The light source 602 is coupled to launch light into a waveguide taper 604 and a planar GRIN lens 606. The taper 604 and lens 606 couple light from the light source 602 to a three-dimensional channel waveguide 608 for light delivery elsewhere in a slider. The shape of the taper 604 may be linear (as shown), or follow a curve, such as a parabolic curve. The GRIN lens 606 may also follow the shape of the taper as projected onto the x-y plane, or may have some other sectional shape (e.g., rectangular) projected on the x-y plane.

Figure 7:
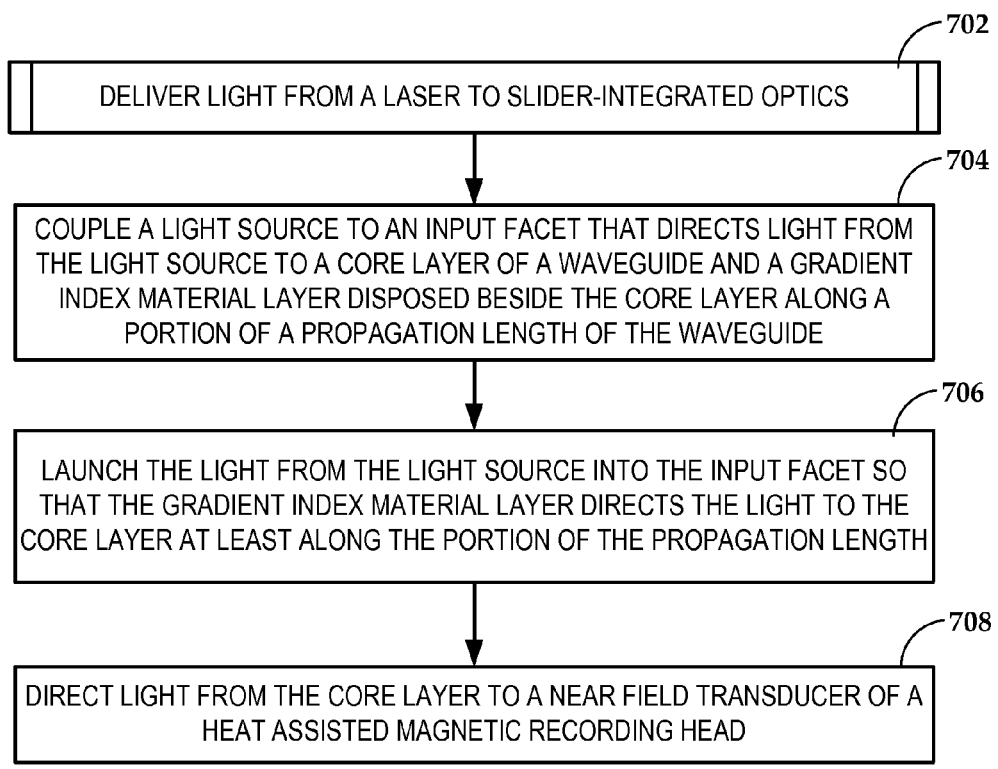
FIG. 7 is flowchart illustrating a procedure according to an example embodiment.

In reference now to FIG. 7, a flowchart illustrates a procedure 702 for delivering from a laser to slider integrated optics. The procedure involves coupling 704 a light source to an input facet that directs light from the light source to a) a core layer of a waveguide, and b) a gradient index material layer disposed beside the core layer along a portion of a propagation length of the waveguide. The light is launched 706 from the light source into the input facet so that the gradient index material layer directs the light to the core layer at least along the portion of the propagation length. The procedure 702 may also optionally involve directing light from the core layer to a near field transducer of a heat assisted magnetic recording head.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
a waveguide comprising:
a core layer extending along a propagation length of the waveguide;
a cladding layer surrounding at least part of the core layer along the propagation length; and
a gradient index material layer disposed beside the core layer along a portion of the propagation length where light is launched into the waveguide via an input facet, wherein the gradient index material layer comprises homogeneous refractive indices along cross sections parallel to a plane of the gradient index material layer and is configured to direct light from the input facet to the core layer at least along the portion of the propagation length.

2. The apparatus of claim 1, wherein the gradient index material comprises a range of effective refractive indices that is between respective refractive indices of the core layer and the cladding layer.

3. The apparatus of claim 1, wherein the gradient index material layer comprises a multi-layer slab of first and second materials with differing refractive indices.

4. The apparatus of claim 1, wherein the gradient index material layer comprises a hyperbolically shaped index profile.

5. The apparatus of claim 1, wherein the gradient index material layer comprises a parabolically shaped index profile.

6. The apparatus of claim 1, wherein the gradient index material layer and at least a portion of the core layer and are planar.

7. The apparatus of claim 6, wherein the portion of the core layer comprises a tapered cross sectional shape on the plane.

8. The apparatus of claim 1, wherein the waveguide is configured to provide light from the core layer to a near field transducer of a heat assisted magnetic recording head.

9. The apparatus of claim 1, wherein the light is launched into the waveguide from at least one of an edge emitting laser diode and a surface emitting laser diode.

10. A method comprising:
coupling a light source to an input facet that directs light from the light source to a) a core layer of a waveguide, and b) a gradient index material layer disposed beside the core layer along a portion of a propagation length of the waveguide, the gradient index material layer comprising homogeneous refractive indices along cross sections parallel to a plane of the gradient index material layer; and
launching the light from the light source into the input facet so that the gradient index material layer directs the light to the core layer at least along the portion of the propagation length.

11. The method of claim 10, wherein the gradient index material layer comprises a multi-layer slab of first and second materials with differing refractive indices.

12. The method of claim 10, wherein the gradient index material layer comprises at least one of a hyperbolically shaped index profile and a parabolically shaped index profile.

13. The method of claim 10, further comprising directing light from the core layer to a near field transducer of a heat assisted magnetic recording head.

14. The method of claim 10, wherein coupling the light source to the input facet comprises coupling an output of at least one of an edge emitting laser diode and a surface emitting laser diode to the input facet.

15. A system comprising:
a laser;
a heat assisted magnetic recording slider coupled to the laser, comprising:
a waveguide comprising a core layer extending along a propagation length of the waveguide and a cladding layer surrounding at least part of the core layer along the propagation length; and
a gradient index material layer disposed beside the core layer along a portion of the propagation length; and
an input facet receiving light launched from the laser into the core layer and gradient index material layer, wherein the gradient index material layer comprises homogeneous refractive indices along cross sections parallel to a plane of the gradient index material layer and is configured adapt a beam profile of the laser to a different profile suitable for propagation through the waveguide.

16. The system of claim 15, wherein the gradient index material layer and at least a portion of the core layer of the waveguide are planar.

17. The system of claim 16, wherein at least the core layer comprises a tapered cross sectional shape on the plane.

18. The system of claim 16, further comprising a planar collimator parallel to the plane and coupled to receive the light from the core layer of the waveguide.

19. The system of claim 18, further comprising a solid immersion mirror coupled to received light from the collimator and focus the light to heat a magnetic media.

20. The system of claim 16, wherein laser comprises at least one of an edge emitting laser diode and a surface emitting laser diode.

* * * * *